United States Patent
Gerholt et al.

[11] 3,711,124
[45] Jan. 16, 1973

[54] CONNECTIONS FOR INSULATED PIPES

[75] Inventors: Willem Gerholt, Hardenberg; Gerrit Heidemann, Oldenzaal, both of Netherlands

[73] Assignee: Industriele Onderneming Wavin N.V., Zwolle, Netherlands

[22] Filed: April 30, 1970

[21] Appl. No.: 33,227

[30] Foreign Application Priority Data

Feb. 12, 1970 Netherlands....................7002034

[52] U.S. Cl....................................285/47, 285/351
[51] Int. Cl..............................................F16l 11/12
[58] Field of Search........285/45, 351, 47, 48, 50, 53, 285/293; 138/149

[56] References Cited

UNITED STATES PATENTS

| | | | |
|---|---|---|---|
| 2,964,064 | 12/1960 | Jones | 285/47 |
| 3,534,985 | 10/1970 | Kuypers et al. | 285/53 |
| 3,273,600 | 9/1966 | Swan | 138/149 X |
| 3,453,716 | 7/1969 | Cook | 285/286 X |
| 3,492,029 | 1/1970 | French et al. | 285/47 |
| 2,894,538 | 7/1959 | Wilson | 285/53 |
| 3,369,826 | 2/1968 | Boosey et al. | 285/47 |

FOREIGN PATENTS OR APPLICATIONS

| | | | |
|---|---|---|---|
| 6,405,874 | 1/1965 | Netherlands | 285/45 |
| 410,120 | 5/1934 | Great Britain | 285/53 |
| 447,735 | 3/1968 | Switzerland | 285/47 |
| 76,765 | 12/1954 | Netherlands | 138/149 |

*Primary Examiner*—Dave W. Arola
*Attorney*—Woodhams, Blanchard and Flynn

[57] ABSTRACT

The invention relates to a connection of steel pipes, with an external continuous polyurethane foam layer and a fiber reinforced polyester or epoxy resin, or polyethylene tape covering layer. The polyethylene covering layer is obtained by wrapping polyethylene tape of 170°C around the foam plastic, whereby overlapping parts are completely heat sealed to each other. The covering layer engages sealingly the outer surface of the steel pipe by means of a protective thermoplastic or thermosetting layer.

The foam plastic between the ends of the two steel pipes connected by welding is covered with a glass fiber reinforced polyester or epoxy resin layer or covered with a thermoplastic sleeve, whereby rubber rings are present between the sleeve and the covering layer.

2 Claims, 4 Drawing Figures

PATENTED JAN 16 1973 3,711,124

INVENTORS
WILLEM GERHOLT
GERRIT HEIDEMANN
BY
Woodhams, Blanchard & Flynn
ATTORNEYS

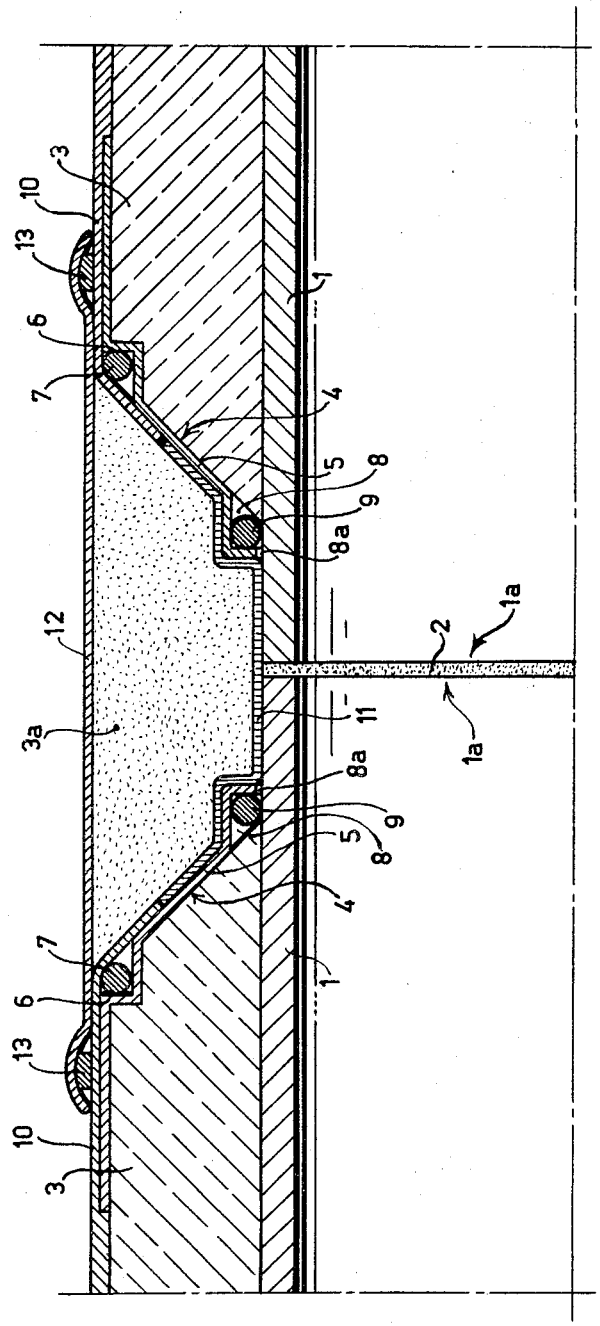

CONNECTIONS FOR INSULATED PIPES

BRIEF SURVEY OF THE PRIOR ART

The invention relates to a connection for pipes which are provided with an external foam plastic layer carrying a covering outer layer and a length of pipe for making this connection.

Pipes with a foam plastic insulation, mostly consisting of a metal pipe carrying a foam plastic layer on the outer surface and a covering outer layer are known. This covering layer may consist of thermoplastic material or thermosetting material. Such tubes present the disadvantage that either the covering layer is not perfectly water tight and gas tight or that the connection between two adjacent pipes is not perfectly water tight and gas tight or both. An example of a covering layer which is not gas and water tight under extreme conditions such as on the bottom of a river, is a covering layer obtained by wrapping thermoplastic tape material helically or non-helically round the foam plastic layer whereby the overlapping portions of the tape are connected by glueing.

Moreover as such pipes manufactured in great lengths can not be provided with a foam plastic layer as far as their extreme end, since the ends of the metal pipes should be welded to one another relatively large portions of the metal pipe situated in the proximity of the welded joint must be insulated later. It should be ensured that at the location of the connection no moisture can penetrate into the connecting part, and if anyhow this would nevertheless occur, this moisture should be prevented from penetrating into the foam plastic insulating layer provided around the pipes. On the other hand it is advisable to see to it that moisture, if any, in a pipe part between the foam plastic insulation and the outer side of the pipe is prevented from penetrating into other pipe parts with foam plastic insulation as this has a detrimental effect.

As the pipes are at present applied on a large scale for the transport of fluids of low temperature, e.g., liquefied hydrocarbons, over long distances absolutely reliable gas and water tight covering outer layers and connections are required. This holds the more so as loss of insulation might give rise to accidents by a sudden evaporation of the liquid gas.

OBJECTS OF THE INVENTION

It is now an object of the invention to overcome these troubles by providing pipes and a connection for such pipes, wherein at the location of the connection between two pipes an efficient insulation is available and moisture penetrating into this part can never penetrate into the foam plastic insulating layer provided around the pipe, while on the other hand moisture which is possibly present between the pipe and the foam plastic insulation can never penetrate from one pipe part into another pipe part. At last penetration of moisture from outside into the foam plastic layer provided around a pipe part is prevented by means of the covering layer and a lining layer.

This object is attained in the way that a connection for a first and a second pipe comprising at least an external, whether or not reinforced foam plastic layer terminating at some distance of the connection of the two pipes and the foam plastic layer carrying a covering outer layer is according to the invention, wherein the outer covering layer of at least one pipe, and preferably of both pipes, is provided with a protective covering layer which cooperates tightly with the free outer surface of the pipe and with the covering outer layer, the space between the foam plastic layers on both pipes being filled with foam plastic and a continuous lining layer, preferably of thermoplastic material or fiber reinforced thermosetting resin is provided, which cooperates clampingly with the outer surface of the continuous outer covering layers on both pipes.

The lining layer which cooperates clampingly with the outer covering layer excludes penetration of moisture, whilst the protective covering layer or layers prevent transport of moisture or vapor from one length into another length of pipe. The clamping action of the lining layer is e.g., obtained by subjecting a tubular thermoplastic material to heat treatment. The lining layer may be sealed to the covering layer, if desired and if possible. Due to shrinking of thermosetting resins during curing a similar clamping of a fiber reinforced thermosetting resin lining layer is obtained.

Advantageously a ring of elastical material is present between each covering layer and the lining layer, shrunk onto the covering layers. A very suitable lining layer for this purpose is a thermoplastic tube or tubular foil e.g., of polyvinylchloride, polyethylene or polypropylene which is shrunk onto the covering layers by subjecting the thermoplastic tube to a heat treatment e.g. 150° C for polyvinylchloride.

Due to the application of a shrunk lining layer which on either side distant from the space between the ends of the covering layers cooperates with the covering layer and due to the fact that between the covering layer and the lining layer a ring of elastic material is provided there is ensured an absolutely gas and water tight sealing of the space between the ends of the foam plastic layer, so that when this space is filled with a foam plastic insulation an absolutely uniform insulation throughout the pipe line is achieved. The elastic material may be rubber or similar material.

If desired the shrunk lining layer can be connected with the covering layer which is provided around the foam plastic layer of each pipe.

The covering layer can be provided in a very simple way on the foam plastic layer, if according to the invention it consists of a tape of thermoplastic material which is wound around the outer side of the foam plastic layer and the cooperating parts of the individual windings are sealed preferably heatsealed to each other. Particularly advantageous is the step of connecting the edge of the overlapping part with the underlaying tape layer.

The covering layer may also consist of a hardened, glass fiber reinforced, thermosetting resin layer.

According to another embodiment the covering layer consists of a continuously extending plastic tubular foil which is clampingly disposed around the foam plastic insulation. This can be easily arranged when just before the foam plastic layer expands the tube consisting of a thin plastic foil is pulled over the tube to be insulated. Due to the fact that the space between the tube and the foil is filled by the expanding plastic, the foil is secured in position. The end is shrunk onto the pipe surface.

In order to ensure a perfectly water tight and gas tight sealing of the foam plastic layer round a pipe it is particularly advisable to wrap round the pipe, after the layer of foam plastic material has been provided by spraying, a warm tape of thermoplastic material, like a polyethylene tape, while during the wrapping operation simultaneously the whole overlapping portions of such a tape are perfectly sealed on each other. In practice this can be very efficiently effected by wrapping around the pipe, insulated by applying foam plastic by spraying of a foamable plastic composition, a still warm polyethylene, polyvinylchloride, or polypropylene tape, which directly issues from an extruder, whereby due to the comparatively high temperatures at which the tape issues from the extruder, the overlapping parts of the polyethylene tape are completely heatsealed to each other, thereby forming a closed continuous covering layer.

The foam plastic layer is preferably applied by spraying a foamable plastic composition onto a rotated length of pipe Preferably a polyurethane foam plastic resistant to temperatures over 120° C (EME 140 polyurethane foamable composition) is used in case of insulating pipe for transport of heated fluids.

SUMMARY OF THE DRAWING

FIG. 4 represents another embodiment of a connection of pipes.

DESCRIPTION OF A PREFERRED EMBODIMENT

Figure 1:
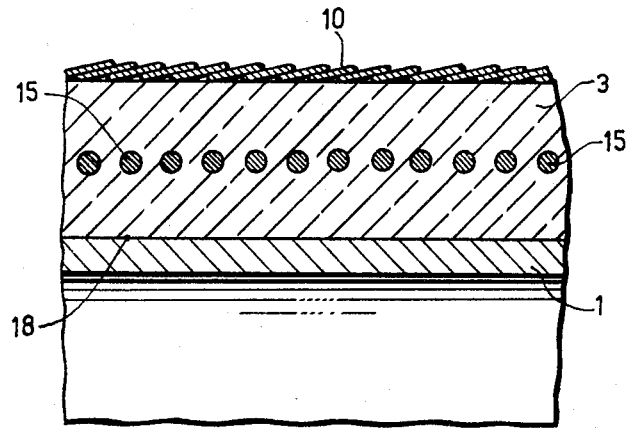
FIG. 1 represents a section of a part of a pipe provided with reinforced foam plastic insulation and a covering layer.

FIG. 1 shows part of a steel pipe 1, which is provided with a polyurethane foam plastic layer 3 and a covering layer 10. The polyurethane foam plastic layer is applied to the steel pipe by spraying a foamable polyurethane plastic composition onto the steel pipe which is rotated during this treatment. A foamable composition may consist of 100 parts of Desmophene, 25 parts of Freon 11, 4 parts of Desmorapid and 110 parts of Desmodur. Before applying the foamable composition the outer surface 18 of the steel tube 1 may be provided with a corrosion resistant coating, which is known per se.

In some cases it may be advisable to reinforce the foam plastic layer 3 by inserting reinforcing layers, e.g., glass tissue E 130, polyester tissue or even foil material such as polyethylene foil. In this way any cracking of the foam provoked by expansion and shrinking of the steel tube will be limited by these reinforcing layers as a crack will stop after having reached a reinforcing layer.

By using a relatively coarse meshed tissue a good cohesion of the whole plastic foam layer 3 is secured. Although this cohesion may be partly or completely lost by using a polyethylene foil (of 0,05 mm thickness), the shrinking effect of the covering layer (either of thermoplastic or of thermosetting resin) will exert a compressive effect onto the foam plastic so that layers at both sides of such a foil are pressed onto each other.

The covering layer 10 is applied by wrapping polyethyleneband of a temperature of 160° – 180° C around the foam layer 3.

As already described the overlapping portions are completed heatsealed to each other, thereby forming a continuous moisture and gas tight covering layer 3 which shrinks around the foam plastic during cooling.

It is also possible to wrap thermoplastic tape material such as polypropylene around the foam plastic and connecting the overlapping parts particularly the free edge of the upper tape part and the underlaying tape winding by heatsealing or by means of a solvent dissolving the thermoplastic surface layer but in that case the shrinking effect will be relatively small and accordingly the thermoplastic material will not exert an even pressure on the foam plastic layer.

Figure 2:
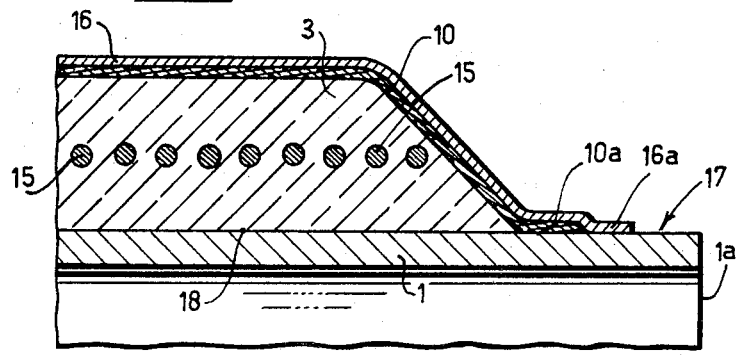
FIG. 2 represents an end section of a pipe provided with two covering layers.
Figure 3:
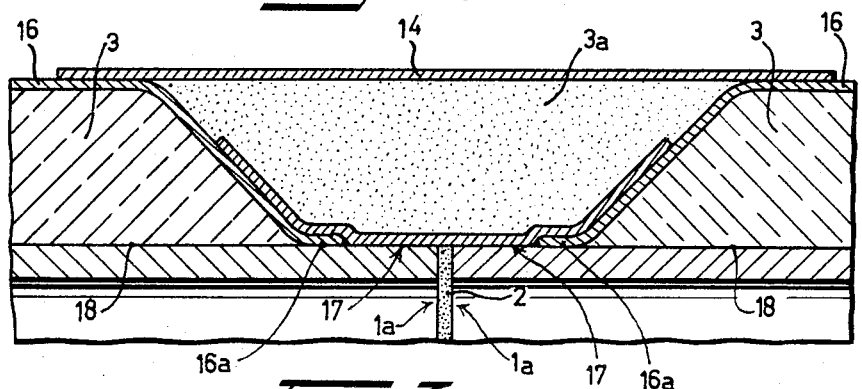
FIG. 3 represents a first embodiment of a connection of pipes provided with foam insulation and a covering layer.

As the separate steel pipes must be connected by welding an end part of the pipe is not provided with foam plastic. To prevent any penetration of moisture into the foam plastic layer during transport of the insulated pipe, a protective layer which cooperates sealingly with the free pipe end part 17 and with the covering layer 10 or 16 is present. This protective layer may be of the same material as the covering outer layer, as shown in FIGS. 2 and 3, where the protective layer corresponds to the slanting surface of layer 16 extending between the pipe surface and the outer diameter of the insulated pipe. The end part 16a of the protection layer terminates at some distance (e.g. 10–15 cm) from the pipe end 1a.

The protective layer may also consist of other material than the covering layer as shown in FIG. 4, where the protective layer consist of a hood 5 of fiber reinforced thermosetting (e.g., polyester) resin. This hood 5 cooperates tightly with the outer surface 18 of pipe end part 17 and with a thermoplastics covering layer 10.

The covering layer 10 may also consist of a tubular foil of thermoplastic material such as polyethylene which is pulled over the tube to be insulated. By choosing the inner diameter of the tubular foil greater than the outer diameter of the tube the space between the tubular foil and the tube to be insulated can be filled by expanding foam plastic. By heat treatment the tubular foil can be shrunk onto the steel tube.

The covering layer may also consist of glass fibers, which after the insulating layer 3 has expanded, are wound around the foam plastic and thereupon coated with a thermosetting resin. The hardening of the reinforced resin layer can be promoted by admixing a catalyst. In this way (FIG. 2) an excellent covering tight layer 16 is obtained, the free end 16a of same cooperating with the steel surface end part 17. Due to the very good adherence of such fiber reinforced thermosetting resin layers to the steel surface penetration of moisture is excluded.

To combine the properties of hardness of fiber reinforced resin layers with the elastical properties of thermoplastic materials the foam layer may be provided with an outer fiber reinforced polyester covering outer layer 16 and an inner layer of thermoplastic material 10. Both layers cooperate with the end part 17 of steel pipe 1.

The inner layer 10 may also consist of a self curing rubber, such as a commercial butylrubber, which is applied by wrapping a tape of butylrubber around the foam plastic. Overlapping parts of the tape are connected by curing. It is advisable to use this layer together with a reinforced thermosetting resin layer e.g., polyester resin, epoxyresin, etc.

The thermoplastic or rubber layer 10 acts in these cases as vapor barrier.

A self curing rubber is particularly recommended in cases where an excellent adherence between the pipe surface and the vapor barrier is required.

Preferably a polyurethane foam plastic being resistant to temperatures over 120° C is used, such as EME 140.

FIG. 3 shows a first embodiment of a pipe connection of steel pipes provided with a foam insulation and a covering outer layer 16 of fiber reinforced thermosetting (e.g., polyester) resin.

The ends 1a of the pipes are connected by welding. To exclude any moisture penetration glass fibers may be wound from halfway the protective layer connecting the pipe surface end parts 17 and the cylindrical layer 16 and around the end parts 17. These fibers are impregnated with thermosetting polyester or epoxy resin to form a resin layer. With or without said additional glass fiber reinforced thermosetting resin layer, two half cylindrical moulds are put around the free space between the two pipes 1, whereafter this space is filled with a polyurethane foam plastic 3a. After removal of the half moulds glass fibers are wound around the free polyurethane foam plastic surface and over a certain distance (e.g. 10 cm) around the covering layer 16.

The fibers are impregnated with polyester or epoxyresin together with a curing agent. After curing at ambient temperature a lining layer 14 is obtained.

According to another embodiment a tube or tubular foil of thermoplastic material 14 is slid over one of the insulated pipes before connecting two pipes by welding. After having filled the space 3a, the thermoplastic tube 14 is slid over the foam and shrunk onto the covering layers 16 of both tubes, thereby forming a thermoplastic lining layer 14.

It will be obvious that covering layer 16 may also consist of thermoplastics.

In FIG. 4 is represented another connection of two metal pipes I provided with a continuous urethane foam plastic layer and a covering layer of thermoplastic material. The ends 1a of the metal pipes are interconnected by a welded joint 2. It is obvious that instead of metal pipes 1 also plastic pipes can be used which are also interconnected by welding.

Provided around each pipe 1 is a polyurethane foam plastic insulating layer 3, while a covering layer 10 is provided around this foam plastic layer 3. This covering layer is formed by wrapping a warm polyethene tape of 170°C, issuing from the extruder around the foam plastic layer, whereby the overlapping portions of such a tape under the influence of the temperature and the plastic conditions of the polyethene are completely heatsealed to each other thereby forming a gas and water tight finishing layer.

A polyurethane foam plastic insulation 3a is provided between the two ends of the foam plastic layer on the two interconnected pipes, this insulation may likewise consist of polyurethane foam plastic, but it is obvious that also foam plastics can be applied different from those used for the foam plastic layer 3. This foam plastic insulating layer 3a is obtained (as already described) by expanding a foamable plastic composition in the space between the two ends of the foam plastic layers 3.

Before the pipes are interconnected by means of the welded joint 2 a ring of elastical material such as rubber 13 is provided on the outer side of each covering layer 10. A tubular piece made of polyvinylchloride, polyethylene or another thermoplastic material is slid over this ring, the inner diameter of this tubular piece 12 being greater than the outer diameter of the ring 13 after same has been provided on the covering layer 10. When a widened out tubular piece 12 is employed it will shrink due to heating to e.g., 160°C for polyvinylchloride and thereupon cooperate with the rings 13, whereby an absolutely gas- and water-tight connection is obtained. Instead of a tubular piece 12 obviously also a tubular foil of thermoplastics 12 may be employed. This part 12 forms the lining layer.

In order to improve the connection it is advisable to bevel the ends of the foam plastic layer 3, whilst forming slanting walls 4 whereupon a protective layer in the shape of a hood 5, e.g., consisting of a fiber reinforced thermosetting synthetic resin such as polyester or epoxy resin is slid over the pipe, the profile of this hood 5 being related to the profile of the inclined wall 4 and the profile of the foam plastic layer 3. The hood 5 is provided on the foam plastic layer 3 before the tape has been wrapped to the end. The tape 10 is wrapped as far as about halfway down the inclined plane 4. A second ring 9 of elastical material, which clampingly cooperates with the sealing means 5 in the shape of the hood, is provided between the outer side of the metal or plastic pipe 1, and the side of the hood shaped sealing means 5 which is turned to the foam plastic layer 3 and the pipe 1, that is to say on the end 1a of the pipe 1 which is not covered with foam plastic.

In particular cases it may be advisable to wrap a layer of fibers 11 forming a finishing layer from halfway the inclined planes 4 and around the ends of the tubes 1 which are not covered with foam plastic and to impregnate these fibers with thermosetting polyester resin. In this way an additional sealing can be achieved, while moreover the hood 5 is clampingly pressed on the ring of elastical material 9 which cooperates with the outer side of the metal or plastic pipe 1.

The ring 9 can be advantageously accommodated in a first recess 8. In order to ensure a proper connection between the foam plastic layer 3 with the bevelled plane 4 and a correspondingly profiled hood 5, the latter is advantageously provided with a second recess 6 in the vicinity of the location whereat the outer side of the foam plastic layer 3 slants towards the outer side of the pipe; in this second recess 6 is disposed a third ring 7 of elastical material. The covering layer 10 is wrapped, after the provision of the hood 5 and after the ring has been located in position in the second recess, as far as halfway down the inclined plane of the hood 5. Due to shrinkage of the thermoplastic material on cooling the ring 7 will press the hood 5 against the foam plastic layer 3.

If a hood 5 with a recess 8 is applied preferably there will be a distance 8a between the outer side of the pipe 1 and the free end of the hood, after the provision of the ring 9 of elastical material, whereby a considerable pressure can be exerted on the ring 9.

Instead of glass fibers other reinforcing materials may be used.

What we claim is:

1. An insulated pipeline, comprising in combination:

first and second pipes respectively having first and second end portions disposed adjacent and fixedly connected to one another;

first and second layers of insulating material respectively disposed in surrounding relationship to said first and second pipes, each of said insulating layers comprising an annular layer of foamed plastic material terminating at a location spaced from the respective end portion whereby the adjacent axial ends of the first and second insulating layers define an annular space therebetween in surrounding relationship to the annular end portions of said first and second pipes;

first and second annular covering layers respectively disposed in surrounding relationship to said first and second insulating layers for sealingly enclosing the foamed plastic material of said covering layers;

protective covering means cooperating tightly with the outer surface of the end portions of said pipes and with said first and second covering layers for creating a sealed relationship therewith, said protective covering means including an annular member positioned in surrounding relationship to an end portion of one of said pipes, said annular member having at least a portion thereof disposed between the covering layer and the insulating layer associated with said one pipe;

said protective covering means also including an annular recess formed in said annular member in surrounding relationship to the end portion of said one pipe, and an annular ring of elastomatic material disposed in said recess in surrounding relationship to said one pipe whereby said ring of elastomatic material is clamped between and sealingly engages said annular member and an external surface of said end portion of said one pipe;

an annular sleeve of foamed plastic material disposed within the annular space provided between the adjacent ends of said first and second insulating layers, said annular sleeve of foamed plastic material being disposed in surrounding relationship to said protective covering means; and an annular lining layer disposed in surrounding relationship to said annular sleeve of foamed plastic material, said annular lining layer having the opposite ends thereof co-operating with and sealingly engaging the outer surfaces of the first and second covering layers.

2. An insulated pipeline, comprising in combination:

first and second pipes respectively having first and second end portions disposed adjacent and fixedly connected to one another;

first and second layers of insulating material respectively disposed in surrounding relationship to said first and second pipes, each of said insulating layers comprising an annular layer of foamed plastic material terminating at a location spaced from the respective end portion whereby the adjacent axial ends of the first and second insulating layers define an annular space therebetween in surrounding relationship to the annular end portions of said first and second pipes, the adjacent ends of the insulating layers having end surfaces which slant toward the external surface of the pipe;

first and second annular covering layers respectively disposed in surrounding relationship to said first and second insulating layers;

protective covering means cooperating tightly with the outer surface of the end portions of said pipes and with said first and second covering layers for creating a sealed relationship therewith, said protective covering means including an annular member positioned in surrounding relationship to an end portion of one of said pipes and having a shape substantially corresponding to the outer profile of the end of the insulating layer associated with said one pipe;

said protective covering means also including an annular recess formed in said annular member approximately at the location where the outer surface of the insulating layer starts to slant toward the outer surface of the pipe, and an annular ring of elastomeric material disposed in said recess in surrounding relationship to the annular member, and said covering layer associated with said one pipe extending beyond said recess whereby said ring of elastomeric material is disposed between and sealingly engages said annular member and said covering layer;

an annular sleeve of foamed plastic material disposed within the annular space provided between the adjacent ends of said first and second insulating layers, said annular sleeve of foamed plastic material being disposed in surrounding relationship to said protective covering means; and an annular lining layer disposed in surrounding relationship to said annular sleeve of foamed plastic material, said annular lining layer having the opposite ends thereof cooperating with and sealingly engaging the outer surfaces of the first and second covering layers.

* * * * *